US009453531B2

(12) United States Patent
Habibvand

(10) Patent No.: US 9,453,531 B2
(45) Date of Patent: Sep. 27, 2016

(54) INTEGRATED BEARING ASSEMBLIES FOR GUIDED ATTACK ROCKETS

(71) Applicant: Roller Bearing Company of America, Inc., Oxford, CT (US)

(72) Inventor: Alex Habibvand, Orange, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 108 days.

(21) Appl. No.: 14/468,677

(22) Filed: Aug. 26, 2014

(65) Prior Publication Data

US 2016/0010685 A1   Jan. 14, 2016

Related U.S. Application Data

(60) Provisional application No. 61/869,878, filed on Aug. 26, 2013.

(51) Int. Cl.
| F16C 19/54 | (2006.01) |
| F16C 25/06 | (2006.01) |
| F42B 15/01 | (2006.01) |
| F42B 15/36 | (2006.01) |
| F16C 19/16 | (2006.01) |

(52) U.S. Cl.
CPC ............ *F16C 25/06* (2013.01); *F16C 19/548* (2013.01); *F42B 15/01* (2013.01); *F16C 19/163* (2013.01); *F42B 15/36* (2013.01)

(58) Field of Classification Search
CPC ............ F16C 2229/00; F16C 19/181–19/184
See application file for complete search history.

(56) References Cited

U.S. PATENT DOCUMENTS

| 2,858,176 A * | 10/1958 | Thompson ............ B65G 39/09 384/477 |
| 3,067,681 A | 12/1962 | Beman |
| 3,096,129 A | 7/1963 | Hay |
| 3,190,222 A | 6/1965 | Holmstrom |
| 3,411,736 A | 11/1968 | Kelly |
| 5,108,051 A | 4/1992 | Montet et al. |
| 5,560,687 A * | 10/1996 | Hagelthorn ............ B60B 27/001 301/105.1 |
| 6,135,641 A | 10/2000 | Smith |
| 6,299,101 B1 | 10/2001 | Schroppel et al. |
| 8,319,163 B2 | 11/2012 | Flood et al. |
| 8,581,160 B1 | 11/2013 | Sanford |
| 8,745,875 B1 * | 6/2014 | Hagelthorn ............ F16C 41/008 29/724 |

(Continued)

FOREIGN PATENT DOCUMENTS

| CA | 700287 A | 12/1964 |
| CA | 906833 | 8/1972 |

(Continued)

*Primary Examiner* — Thomas R. Hannon
(74) *Attorney, Agent, or Firm* — MKG, LLC

(57) ABSTRACT

A guide mechanism, configured for use with a guided attack rocket, includes an inner housing partially disposed in an outer housing. The inner and outer housings each define a forward end and an aft end. A first angular contact bearing is positioned between the outer housing forward end and the inner housing forward end. A second angular contact bearing is positioned between the outer housing aft end and the inner housing aft end. A retaining nut is received over the inner housing forward end. The retaining nut preloads the first and second angular contact bearings. Each of the angular contact bearings includes an inner member disposed within an outer member. The outer member defines an outer raceway and the inner member defines an inner raceway. A plurality of rolling elements is disposed between the outer raceway and the inner raceway.

24 Claims, 6 Drawing Sheets

(56) References Cited

U.S. PATENT DOCUMENTS

2012/0181376 A1 7/2012 Flood, Jr. et al.
2013/0206030 A1 8/2013 Buttolph et al.
2015/0030277 A1* 1/2015 Pick .................... F03D 11/0008
                                                      384/558

FOREIGN PATENT DOCUMENTS

| DE | 2954199 B3 | 4/2004 |
|----|------------|--------|
| JP | 2004257528 A | 9/2004 |
| KR | 1020120019417 A | 3/2012 |
| WO | 2010083517 A1 | 7/2010 |

* cited by examiner

| Design Option | Pre-load | Stiffness Values ||| Mean Contact Stresses ||
|---|---|---|---|---|---|---|
| | | Radial [LB/IN] | Axial [LB/IN] | Moment [INxLB/RAD] | O/Raceway [KSI] | I/Raceway [KSI] |
| 1 | 35 | 1.341E06 | 0.934E06 | 0.833E06 | 92 | 96 |
| 2 | 35 | 1.297E06 | 0.905E06 | 2.654E06 | 95 | 99 |

INTEGRATED BEARING ASSEMBLIES FOR GUIDED ATTACK ROCKETS

CROSS-REFERENCE TO RELATED APPLICATIONS

This application claims priority to U.S. Provisional Patent Application No. 61/869,878, filed Aug. 26, 2013, the subject matter of which is incorporated herein by reference in its entirety.

TECHNICAL FIELD

The present invention is directed to bearings and, more particularly, to an integrated bearing assembly having a pair of angular contact bearings configured for use with a guidance mechanism for an attack rocket.

BACKGROUND

Bearings are necessary to provide aerodynamic guidance for missiles in their trajectory. The bearing assembly is secured in a guidance mechanism for an attack rocket. It is desirable that such bearing assemblies be lightweight yet provide maximum system stiffness at minimum rolling friction torque. However, optimized system stiffness and torque are fundamentally two opposing properties. Such an assembly must be able to handle loads, shock and vibration while maintaining a steady flight course and thereby requiring minimal power for any course adjustments/corrections during flight. The combination of lightweight, high stiffness and low torque has favorable cascading effects on most support hardware such as electric motors and other electro-optical components as they can be less bulky and lightweight as well. While a guidance mechanism may be stiffened using a multitude of bearings at greater cost and weight, hence requiring heavier motors and other components, one object of the present invention is to achieve maximum stiffness with fewer bearings, with reduced system weight thereby requiring less power to drive such a system.

The guidance mechanism typically is supported within the rocket by multiple pairs of angular contact ball bearings configured for use as a matched set and preloaded with a plurality of retainer nuts. In general, each angular contact ball bearing includes an inner member such as an inner housing, an outer member such as a housing, and a plurality of rolling elements disposed between the inner member and the outer member. In many applications, the plurality of rolling elements is separated by a plurality of spacers wherein typically a spacer is positioned between a pair of rolling elements. Such a pair of angular contact ball bearings is commonly referred to as a "duplexed" pair of bearings or a "duplex bearing."

SUMMARY

In one aspect, the present invention resides in a guide mechanism configured for use with a guided attack rocket, the guide mechanism comprising: an annular outer housing, the outer housing defining a first forward end and a first aft end; an annular inner housing partially disposed in the outer housing, the inner housing defining a second forward end and a second aft end; a first angular contact bearing positioned between the first forward end of the outer housing and the second forward end of the inner housing; a second angular contact bearing positioned between the first aft end of the outer housing and the second aft end of the inner housing; and a retaining nut received over the second forward end of the inner housing, the retaining nut preloading the first and second angular contact bearings; wherein each of the first and second angular contact bearings comprises, an outer member defining an outer raceway, an inner member disposed within the outer member, the inner member defining an inner raceway, and a plurality of rolling elements disposed between the outer raceway and the inner raceway.

In another aspect, the present invention resides in a guide mechanism configured for use with a guided attack rocket. The guide mechanism includes an annular inner housing partially disposed in an outer housing. The outer housing defines a first shoulder radially inwardly projecting from an inner surface of the outer housing; and a second shoulder radially inwardly projecting from the inner surface. The second shoulder is spaced apart from the first shoulder. The inner housing defines a third shoulder radially outwardly projecting from the annular inner member. A first angular contact bearing having a first outer member and a first inner member disposed within the first outer member. The first outer member engages the first shoulder. A second angular contact bearing having a second outer member and a second inner member disposed within the second outer member. The second outer member engages the second shoulder, and the second inner member engaging the third shoulder. A retaining nut is received over a portion of the inner housing. The retaining nut engages the first inner member. Adjustment of the retaining nut effects a preload of the first angular contact bearing and the second angular contact bearing.

DESCRIPTION OF THE INVENTION

Figure 1:
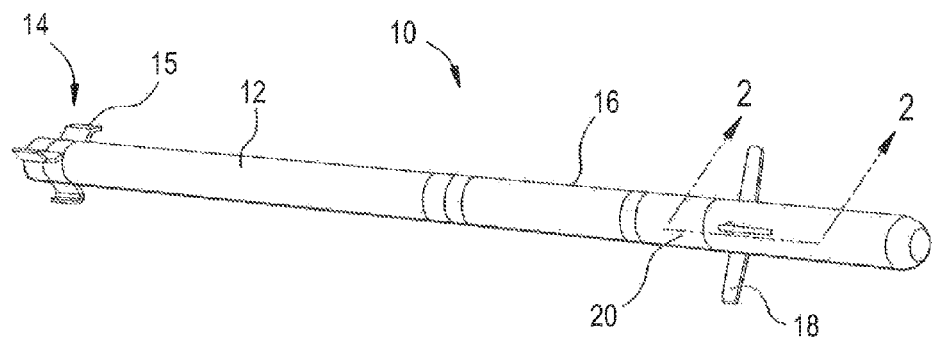
FIG. 1 provides an isometric view of one embodiment of a guided attack rocket in accordance with the present invention.

As shown in FIG. 1, a guided attack rocket 10 typically includes an aft portion 12 housing a motor, and a base 14 comprising wrap-around fins for flight control. A mid portion 16 typically includes munitions and a detonator, fuse or other ignition component. A wing assembly 18 provides further flight control such as, for example, roll control. A forward portion 20 typically includes a mechanism to guide or maneuver the rocket 10 as it approaches its target. One example of such a rocket 10 is a precision-strike DAGR® missile (DAGR® is a registered trademark of Lockheed Martin Corporation).

Figure 2A:
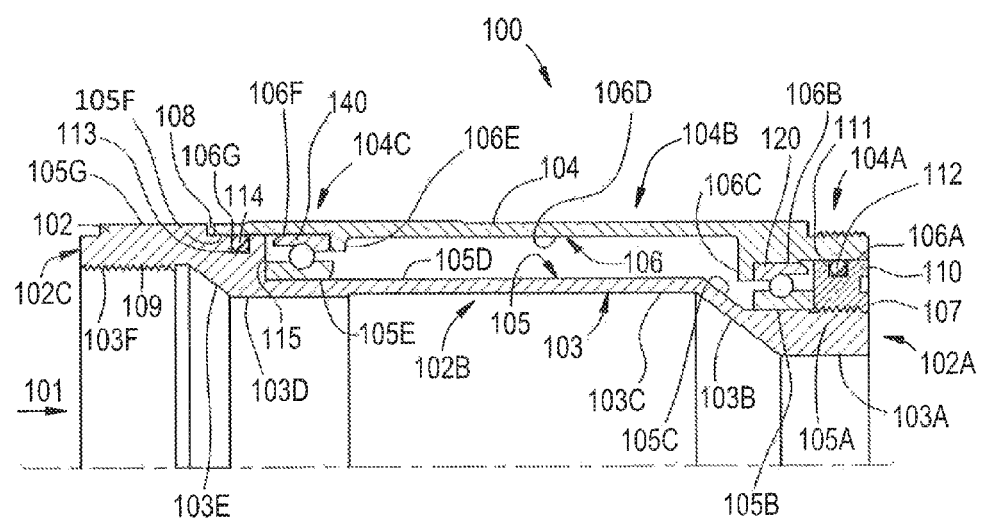
FIG. 2A provides a cross-sectional view of a portion of the one embodiment of the guided attack rocket of FIG. 1 taken along line 2-2 of FIG. 1.

As shown in FIG. 2A, the rocket 10 includes a guide mechanism designated generally by the reference number 100 and is hereinafter referred to as "guide mechanism 100." An annular inner housing 102 defines a first or forward end 102A, a mid section 102B, a second or aft end 102C, and a bore 101 therethrough. Inner housing 102 further defines an interior surface 103 that in turn defines a first or forward end 103A, a first transition portion 103B, a first mid section 103C, a second mid section 103D, a second transition portion 103E, and a second or aft end 103F. In one embodiment, forward end 103A of interior surface 103 of inner housing 102 defines an external thread 107 for threadedly engaging and receiving a retaining nut 110 thereon. In one embodiment, aft end 103F of interior surface 103 of inner housing 102 defines an internal thread 109 for threadedly engaging and receiving a component therein (not shown). Inner housing 102 also defines an exterior surface 105 that in turn defines a first or forward end 105A, a first engagement surface 105B, a first transition portion 105C, a mid section 105D, a second engagement surface 105E, a third engagement surface 105F, and a second or aft end 105G. In one embodiment, inner housing 102 comprises a one-piece inner housing.

The forward end 102A and the mid section 102B of the inner housing 102 are disposed within an annular outer housing 104 that also defines a first or forward end 104A, a mid section 104B, and a second or aft end 104C. Outer housing 104 further defines an interior surface 106 that in turn defines a first or forward end 106A, a first engagement surface 106B, a first integral support shoulder or first abutment 106C, a mid section 106D, a second integral support shoulder or second abutment 106E, a second engagement surface 106F and a second or aft end 106G. In one embodiment, outer housing 104 comprises a one-piece outer housing.

A first sealing element, for example a first O-ring 112, is received within an annular groove 111 defined in retaining nut 110 and sealingly engages forward end 106A of interior surface 106 of outer housing 104. A second sealing element, for example a second O-ring 114, is received within an annular groove 113 defined in third engagement surface 105F of exterior surface 105 of inner housing 102 and sealingly engages aft end 106G of interior surface 106 of outer housing 104. A first angular contact bearing 120 is positioned axially between first abutment 106C of interior surface 106 of outer housing 104 and retaining nut 110; and first angular contact bearing 120 is positioned radially between first engagement surface 105B of exterior surface 105 of inner housing 102 and first engagement surface 106B of interior surface 106 of outer housing 104. A second angular contact bearing 140 is positioned axially between second abutment 106E of interior surface 106 of outer housing 104 and a radially extending annular groove face 115 defined in inner housing 102; and second angular contact bearing 140 is positioned radially between second engagement surface 105E of exterior surface 105 of inner housing 102 and the second engagement surface 106F of interior surface 106 of outer housing 104.

Figure 2B:
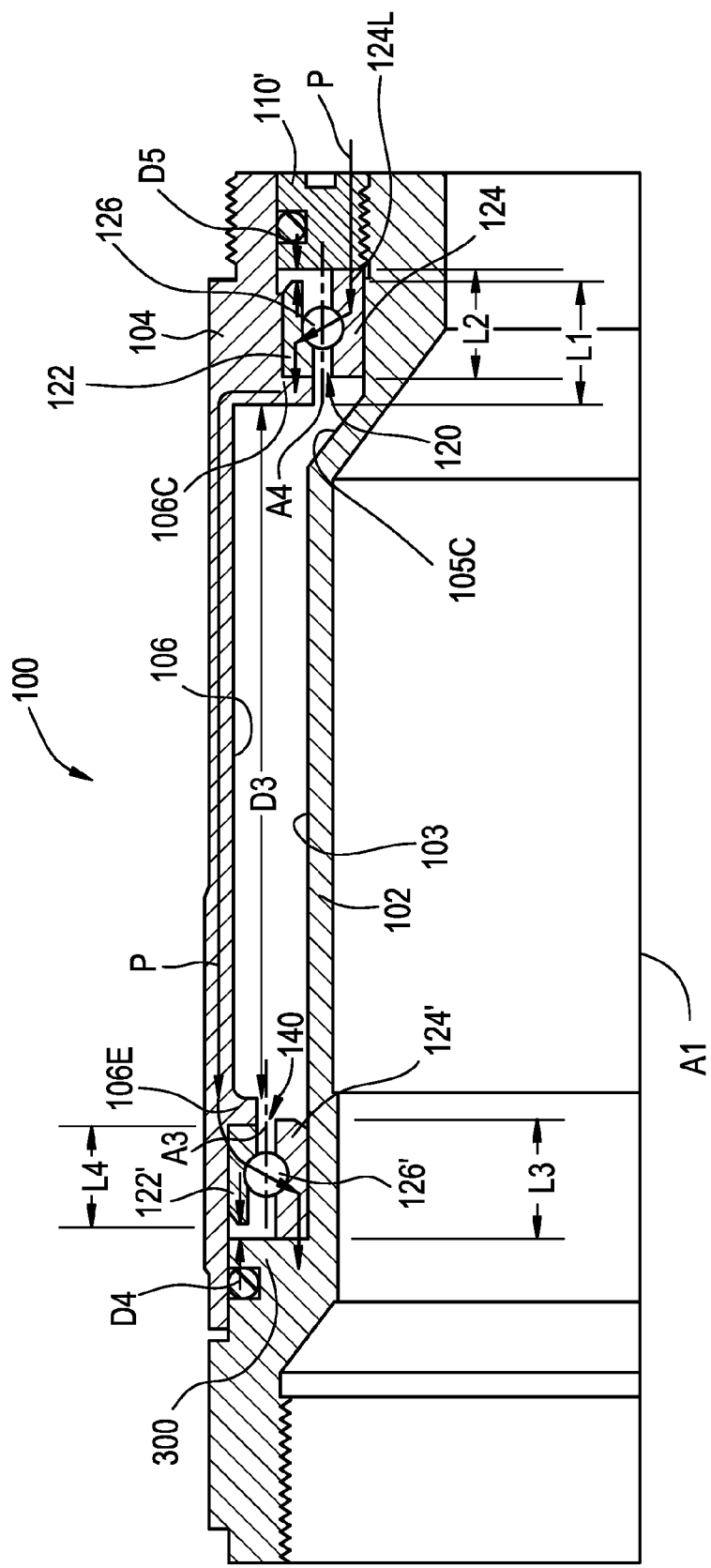
FIG. 2B is another drawing of the guided attack rocket of FIG. 2A showing load path information.
Figure 2C:
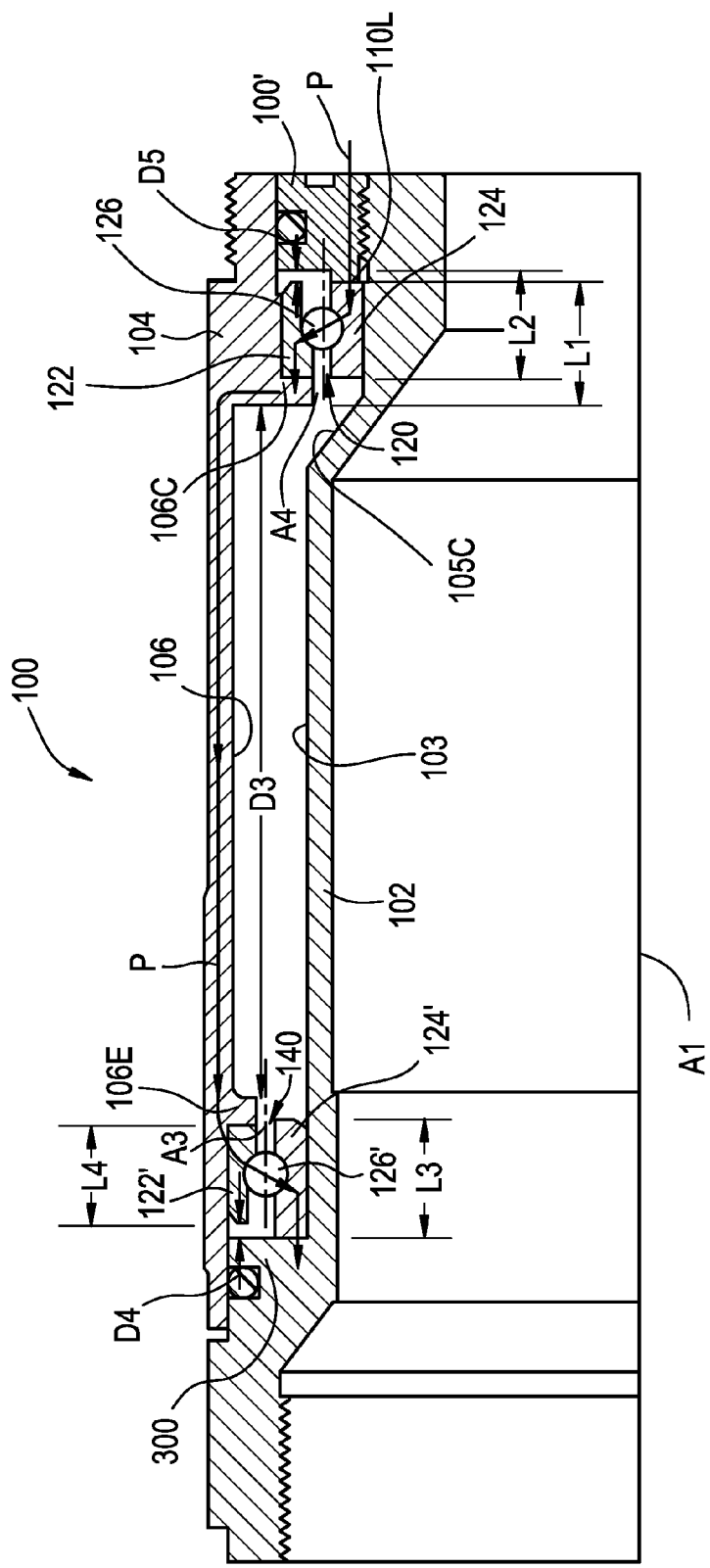
FIG. 2C provides a cross-sectional view of a portion of another embodiment of the guided attack rocket of FIG. 1 taken along line 2-2 of FIG. 1, wherein a retaining nut includes a shoulder.
Figure 2D:
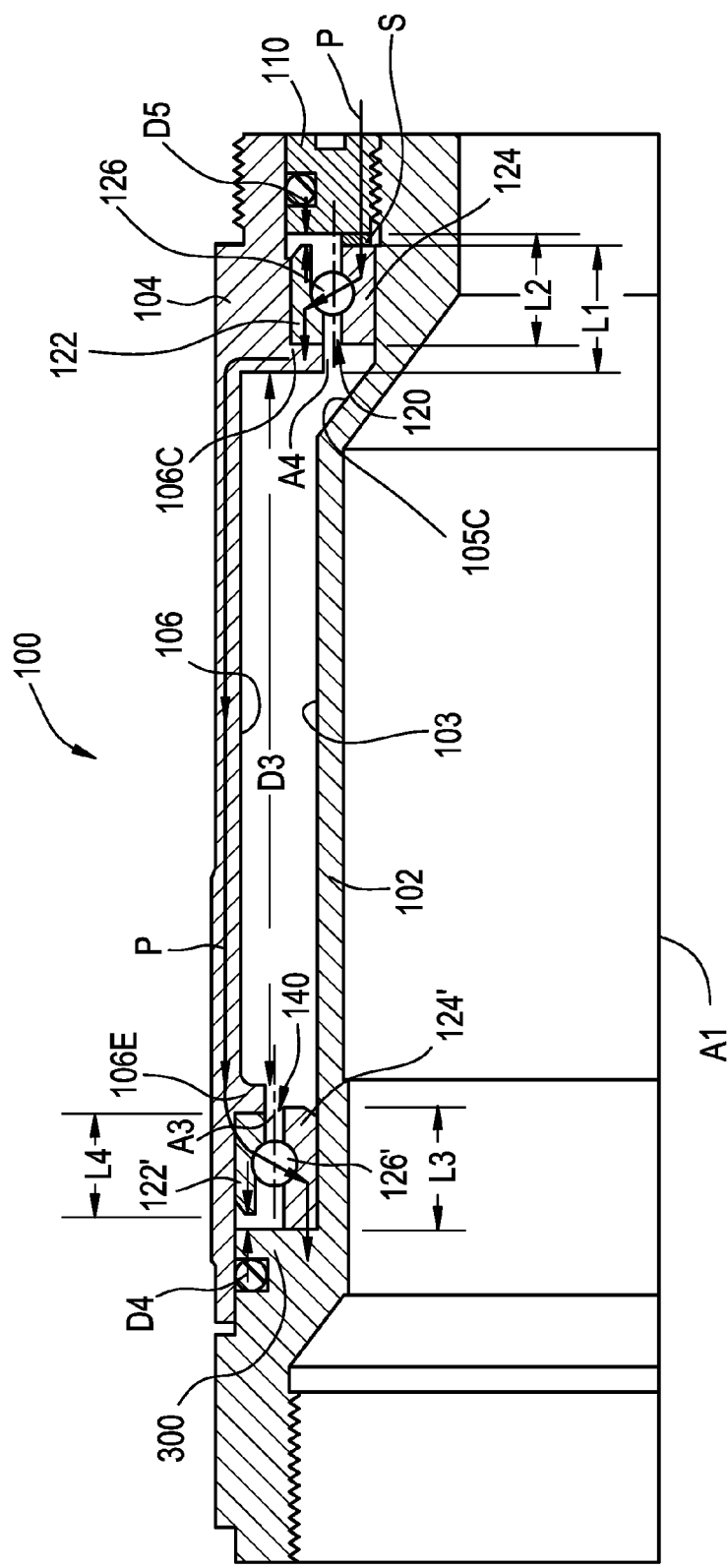
FIG. 2D provides a cross-sectional view of a portion of the another embodiment of the guided attack rocket of FIG. 1 taken along line 2-2 of FIG. 1, wherein the retaining nut includes a spacer.

Referring to FIGS. 2B-2D, the guide mechanism 100 includes the annular outer housing 104 and the annular inner housing 102. The annular outer housing 104 defines the first shoulder 106C and the second shoulder 106E. The first shoulder 106C projects inwardly from the interior surface 106 of the outer housing 104. The second shoulder 106E projects radially inwardly from the interior surface 106 of the outer housing 104. The first shoulder 106C and the second shoulder 106E are spaced apart by a distance D3. The annular inner housing 102 is partially disposed on the outer housing 104, and defines a third shoulder 300. The third shoulder 300 projects radially outwardly from the annular inner member 102. The guide mechanism 100 further includes the first annular contact bearing 120 (describer further herein), the second contact bearing 140 (described further herein) and the retaining nut 110.

Adjustment of the retaining nut 110 effects preload of the first angular contact bearing 120 and the second angular contact bearing 140. As shown in FIG. 2B, an axially inward portion of the retaining nut 110 engages an axial outward extending portion 124L of the inner member 124. Although the axially inward portion of the retaining nut 110 is shown and described as engaging the axial outward extending portion 124L of the inner member 124, the present invention is not limited in this regard as the inner member 124 and the outer member 124 with equal axial lengths may be employed and the nut may employ an axially inward extending portion 110L that engages the inner member 124 so that the retaining nut is spaced apart from the outer member 122 by the distance D5, as illustrated in FIG. 2C. In the embodiment shown in FIG. 2D the inner member 124 and the outer member 124 with equal axial lengths and the retaining nut 110 has not axially inward projection portion. However a spacer S is employed that engages the retaining nut 110 and the inner member 124 so that the outer member 122 is spaced apart from the retaining nut 110 by the distance D5.

The preload is effected via a load path illustrated by the solid line arrows P and defined by the retaining nut 110, the first inner member 124, the first outer member 122, the first shoulder 106C, the outer housing 104, the second shoulder 106E, the second outer member 122', the second inner member 124' and the third shoulder 300 to effect a preload on the first angular contact bearing 120 and second angular contact bearing 140. In one embodiment, the retaining nut 110 establishes a range of axial movement of the outer housing 104 relative to the inner housing 102.

Figure 3:
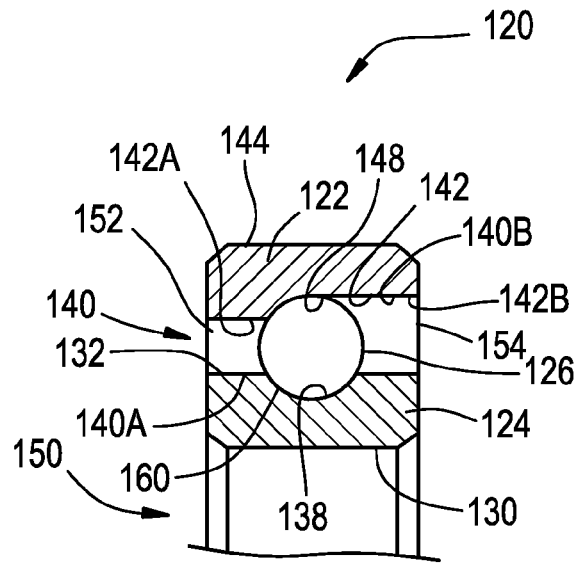
FIG. 3 provides an enlarged cross-sectional view of an angular contact bearing shown in FIG. 2.
Figure 4:
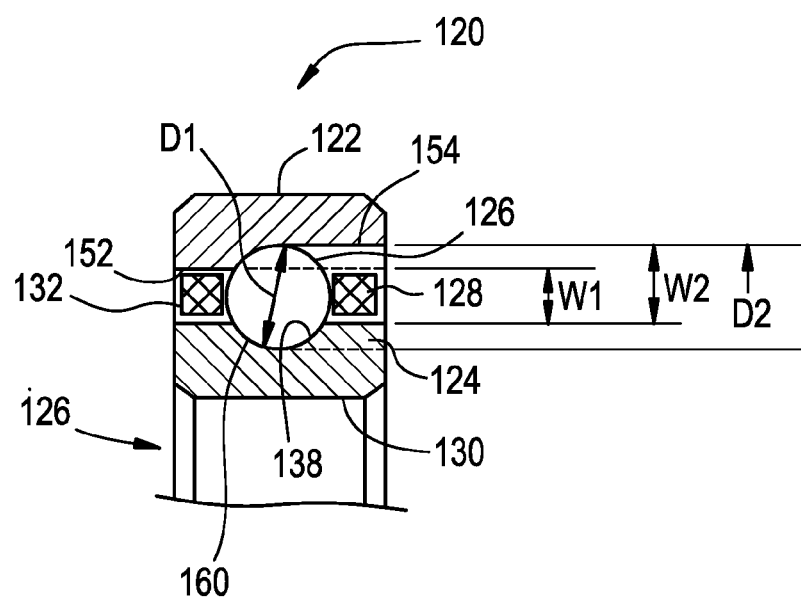
FIG. 4 provides an enlarged cross-sectional view of an angular contact bearing shown in FIG. 2 with a cage.

As shown in FIGS. 2B-D and 3-4, first angular contact bearing 120 comprises a first outer member or first outer ring 122, a first inner member or first inner ring 124 disposed within the first outer ring 122, and a first plurality of rolling elements 126 disposed between the first outer ring 122 and the first inner ring 124. The first angular contact bearing is positioned axially between the first shoulder 106C and the retaining nut 110. The first outer ring 122 and the first inner ring 124 are both generally annular and share a common central axis A1. The first outer member 122 engages the first shoulder 106C. The plurality of rolling elements 126 selectively may include a ball separation element such as, for example, a cage 128 as shown in FIG. 4. While cage 128 has been shown and described as a ball separation element, the present invention is not limited in this regard as other ball separation elements such as, for example, slugs, spacer balls, and toroids, can be employed without departing from the broader aspects of the present invention. In one embodiment, rolling elements 126 comprise ball bearings. In one embodiment, rolling elements 126 comprise load-carrying balls wherein adjacent load-carrying balls are separated by at least one spacer ball.

As further shown in FIG. 3, the inner ring 124 has an annular configuration and defines a bore or a central aperture 150 for receiving inner housing 102 therein as shown and described with reference to FIG. 2A. The inner ring 124 has an interior surface 130 and an exterior surface 132. The inner ring exterior surface 132 defines an inner raceway 138. The outer ring 122 has an annular configuration and defines a bore or a central aperture 140 for receiving the inner ring 124. The outer ring bore 140 has a first end 140A and a second end 140B. The outer ring 122 has an interior surface 142 defining a first end 142A and a second end 142B, and the outer ring 122 has an exterior surface 144. The second end 142B of the outer ring interior surface 142 defines an outer raceway 148. A first annular cavity 152 is defined in the outer ring bore first end 140A, and a second annular cavity 154 is defined in the outer ring bore second end 140B. The inner raceway 138 and the outer raceway 148 cooperate to define raceway 160 in which the plurality of rolling elements 126 are received and thereby provide rotational movement of outer ring 122 in relation to inner ring 124, and in turn, provide rotational movement of outer housing 104 in relation to inner housing 102.

As further shown in FIG. 4, first annular cavity 152 defines a first width W1 and second annular cavity 154 defines a second width W2. Each of the plurality of balls 126 defines a first diameter D1. Raceway 160 defines an outer diameter or a second diameter D2. In one embodiment, first width W1 and second width W2 are less than first diameter D1 such that the plurality of rolling elements 126 are thereby retained in raceway 160. In one embodiment, first width W1 is less than second width W2. In one embodiment, second annular cavity 154 defines an outer diameter substantially similar to second diameter D2 to thereby provide axial movement of outer ring 122 in relation to inner ring 124, and in turn, provide axial movement of outer housing 104 in relation to inner housing 102 to accommodate aerodynamic axial loads in a flight direction. Such a bearing arrangement is commonly referred to as a floating bearing arrangement.

As shown in FIGS. 2B-D, the second angular contact bearing 140 comprises a second outer member or first outer ring 122', the second inner member or first inner ring 124' disposed within the second outer ring 122', and a second plurality of rolling elements 126' disposed between the second outer ring 122' and the second inner ring 124'. The second angular contact bearing is positioned axially between the second shoulder and the third shoulder. The second outer ring 122' and the second inner ring 124' are both generally annular and share a common central axis A1. The second outer member 122' engages the second shoulder 106C. The second inner member 124' engages the third shoulder 300. The plurality of rolling elements 126 selectively may include a ball separation element such as, for example, a cage 128, similar to that shown and described with respect to the first angular contact bearing 120. The design of first and second angular contact bearings 120 and 140 provide for pre-assembly of the angular contact bearings which in turn provides for simple installation in the field.

As shown in FIGS. 2B-2D, the first outer member 122 is positioned axially outward from the first shoulder 106C and is spaced axially apart from the retaining nut 110 by a distance D5. The second outer member 122' is positioned axially outward from the second shoulder 106E and axially inward from the third shoulder 300. The second outer member 122' is spaced axially apart from the third shoulder 300 by a distance D4. An axis A3 defined by an axial center of the second plurality of rolling elements 126' of the second angular contact bearing 140 is positioned radially outward from an axis A4 defined by axial center of the first plurality of rolling elements 126 of the first angular contact bearing 120.

Referring again to FIG. 2A, the retaining nut 110 threadedly engages external thread 107 defined in forward end 103A of interior surface 103 of inner housing 102 and, together with O-ring 112, sealingly engages forward end 106A of interior surface 106 of outer housing 104. Thus, retaining nut 110 provides a bearing seal for first angular contact bearing 120 and prohibits dust and debris from entering at least one of first annular cavity 152 and second annular cavity 154 of first angular contact bearing 120. In one embodiment, the retaining nut 110 is tightened onto external thread 107 to obtain a combined assembly friction torque in the range of about six (6) inch-ounces to about twelve (12) inch-ounces. Friction torque as used herein refers to the torque required to rotate the outer housing 104 relative to the inner housing 102. Thus, the retaining nut 110 or 110' is configured to selectively adjust the friction torque to within a predetermined range. In one embodiment, a thread-locking compound is applied to a portion of external thread 107 prior to installing retaining nut 110 thereon. As shown in FIG. 2, the second angular contact bearing 140 abuts radially extending annular groove face 115 defined in inner housing 102. The radially extending annular groove face 115 provides a bearing seal for second angular contact bearing 140 and prohibits dust and debris from entering at least one of first annular cavity 152 and second annular cavity 154 of second angular contact bearing 140.

Inner housing 102 and outer housing 104 of guide mechanism 100 are fabricated from a material having a first coefficient of thermal expansion ("CTE"), and bearing outer and inner rings 122 and 124 are fabricated from a material having a second CTE. In one embodiment, inner housing 102 and outer housing 104 and bearing outer and inner rings 122 and 124 are respectively fabricated from materials exhibiting a substantially similar CTE. In one embodiment, inner housing 102 and outer housing 104 and bearing outer and inner rings 122 and 124 are respectively fabricated from a corrosion-resistant stainless steel ("CRES") exhibiting a substantially similar CTE. In such an embodiment, it is not necessary that first angular contact bearing 120 comprise a floating bearing arrangement due to the substantially similar CTE of the respective fabrication materials. Thus, the forward bearing is utilized more effectively A typical guide mechanism for a guided attack rocket includes is supported within the rocket by multiple pairs of angular contact ball bearings configured for use as a matched set, referred to as duplex bearings, that are preloaded and installed with a plurality of retainer nuts. Such a design provides a comparatively low assembly stiffness and a comparatively high assembly rolling friction torque. The design of guide mechanism 100 for guided attack rocket 10 provides a comparatively high assembly stiffness in combination with a comparatively low rolling friction torque. In addition, the design of guide mechanism 100 in comparison to a typical guide mechanism reduces the number of bearings in half and the number of retainer nuts from three down to one. Moreover, a guide mechanism according to the present invention is fully interchangeable with a typical guide mechanism with respect to existing external interface mounting features of a guided attack rocket. A guide mechanism according to the present invention provides greater performance with lighter weight, improved manufacturability and ease of assembly.

Figure 5:
FIG. 5 is a table that provides a summary comparison of performance characteristics of a typical guide mechanism for a guided attack rocket and a guide mechanism in accordance with the present invention.

FIG. 5 shows a table 200 that provides a summary comparison of performance characteristics of two guide mechanisms configured for use with a guided attack rocket. Design Option 1 comprises a known guide mechanism. Design Option 2 comprises guide mechanism 100. In Design Option 2, first and second angular contact bearings 120 and 140 exhibit an internal preload optimized proportional to key bearing features such as contact angle, number and diameter of balls so as to achieve mean rolling contact stresses in the range of about 80 KSI to about 110 KSI. This insures proper seating of rolling elements 126 and stiffening of the bearing set without causing excessive rolling friction. Stiffness values 210 and mean contact stresses 212 are provided for Design Options 1 and 2. In comparison with Design Option 1, the radial and axial stiffness values differ by only a few percent due to a slightly smaller forward bearing preloaded against the aft bearing. As shown in FIG. 5, the moment stiffness exhibited by Design Option 1 is 0.833E06 INxLB/RAD, and the moment stiffness exhibited by Design Option 2 is 2.654E06 INxLB/RAD. Accordingly, Design Option 2, the configuration of the present invention, provides an increase in moment stiffness by over 200% in comparison with Design Option 1, a typical configuration. Design Option 2 provides much higher resistance to shock and vibration.

The design of guide mechanism 100 for guided attack rocket 10 also provides a greater combined overall assembly precision in comparison with a typical configuration. The size and form precision of the machined inner housing 102 and outer housing 104 and integral support shoulders thereof, first and second abutments 106C and 106E of interior surface 106 of outer housing 104, is significantly less than the precision of the first and second angular contact bearings 120 and 140. Typically, sizes and forms of an angular contact bearing are controlled within a few 0.0001 inch. An industry accepted standard for the tolerances of a bearing has been promulgated by the Annular Bearing Engineering Committee ("ABEC") of the American Bearing Manufacturers Association ("ABMA") and is known as the ABEC scale. There are five classes of tolerances in the ABEC scale: (from largest to smallest tolerances) 1, 3, 5, 7 and 9. The higher the class, the greater the precision of the bearing. For reasons of cost-effective manufacturability, the size and form tolerances of the machined inner housing 102 and outer housing 104 may be several times greater than those in the first and second angular contact bearings 120 and 140. As such, one effect of installing a high-precision bearing, for example ABEC-7, in a machined housing is degradation of bearing precision. The focus, therefore, is on the combined run-out precision and performance features of an overall assembly. A measurable performance feature can be obtained by running a final assembly at an application's specified revolutions-per-minute and to trace (i.e., record) assembly torque. As long as the torque signature of the assembly is within the specified acceptance limits, the bearing precision by itself is of secondary importance. Accordingly, bearings with slightly lower precision, for example ABEC-5 or ABEC-3, in combination with precision machined inner and outer housings are used for cost-effectiveness.

The design of guide mechanism 100, including the first and second angular contact bearings 120 and 140 respectively installed at outboard ends of the one-piece inner and outer housings 102 and 104 and preloaded against each other using a single retaining nut 110 to achieve desired assembly stiffness and torque, avoids redundancy of bearings and retaining nuts while enhancing performance of the assembly. The design of guide mechanism 100 provides cost-effective utilization of the first and second angular contact bearings 120 and 140 and respective mating components while achieving maximum performance of the bearings. Moreover, the design of guide mechanism 100 provides the capability to preload (i.e., tighten and torque) each of the first and second angular contact bearings 120 and 140 for desired rolling friction, which in turn translates into a desired stiffness in the assembly. Such consistent results are achieved despite stack-up of tolerances and fit variations between individual components.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A guide mechanism configured for use with a guided attack rocket, the guide mechanism comprising:
   an annular outer housing, the outer housing defining a first forward end and a first aft end;
   an annular inner housing partially disposed in the outer housing, the inner housing defining a second forward end and a second aft end;
   a first angular contact bearing positioned between the first forward end of the outer housing and the second forward end of the inner housing;
   a second angular contact bearing positioned between the first aft end of the outer housing and the second aft end of the inner housing; and
   a retaining nut received over the second forward end of the inner housing, the retaining nut preloading the first and second angular contact bearings;
   wherein each of the first and second angular contact bearings comprises,
   an outer member defining an outer raceway,
   an inner member disposed within the outer member, the inner member defining an inner raceway,
   a plurality of rolling elements disposed between the outer raceway and the inner raceway;
   a first sealing element received within a first annular groove defined in the retaining nut that sealingly engages the outer housing; and
   a second sealing element received within a second annular groove defined in the inner housing that sealingly engages the outer housing.

2. The guide mechanism of claim 1, wherein the inner housing comprises a one-piece inner housing.

3. The guide mechanism of claim 1, wherein the outer housing comprises a one-piece outer housing.

4. The guide mechanism of claim 1, wherein the inner housing second forward end defines an external thread for threadedly engaging and receiving the retaining nut thereon.

5. The guide mechanism of claim 1, wherein the retaining nut is configured to selectively establish a predetermined friction torque effecting the rotation of the outer housing relative to the inner housing.

6. The guide mechanism of claim 5, wherein the friction torque is in the range of about six inch-ounces to about twelve inch-ounces.

7. The guide mechanism of claim 1, wherein:
   the inner and outer housings are fabricated from a material having a first coefficient of thermal expansion;

the inner and outer members of the first and second angular contact bearings are fabricated from a material having a second coefficient of thermal expansion; and the first coefficient of thermal expansion is substantially similar to the second coefficient of thermal expansion.

8. The guide mechanism of claim 7, wherein the inner and outer housings and the inner and outer members are respectively fabricated from a corrosion-resistant stainless steel.

9. The guide mechanism of claim 1, wherein the plurality of rolling elements of at least one of the first and second angular contact bearings include a ball separation element.

10. The guide mechanism of claim 1, wherein the first and second angular contact bearings exhibit an internal preload to achieve mean rolling contact stresses in the range of about 80 KSI to about 110 KSI.

11. A guide mechanism configured for use with a guided attack rocket, the guide mechanism comprising:
an annular outer housing, the outer housing defining:
a first shoulder radially inwardly projecting from an inner surface of the outer housing;
a second shoulder radially inwardly projecting from the inner surface, the second shoulder being spaced apart from the first shoulder;
an annular inner housing partially disposed in the outer housing, the inner housing defining:
a third shoulder radially outwardly projecting from the annular inner member;
a first angular contact bearing having a first outer member and a first inner member disposed within the first outer member, the first outer member engaging the first shoulder;
a second angular contact bearing having a second outer member and a second inner member disposed within the second outer member, the second outer member engaging the second shoulder, and the second inner member engaging the third shoulder;
a retaining nut received over a portion of the inner housing, the retaining nut engaging the first inner member;
adjustment of the retaining nut effects a preload of the first angular contact bearing and the second angular contact bearing;
a first sealing element received within a first annular groove defined in the retaining nut that sealingly engages the outer housing; and
a second sealing element received within a second annular groove defined in the inner housing that sealingly engages the outer housing.

12. The guide mechanism of claim 11, wherein the preload is effected via a load path defined by the retaining nut, the first inner member, the first outer member, the first shoulder, the outer housing, the second shoulder, the second outer member, the second inner member and the third shoulder to effect a preload on the first angular contact bearing and second angular contact bearing.

13. The guide mechanism of claim 11, wherein the first outer member is positioned axially outward from the first shoulder.

14. The guide mechanism of claim 11, wherein the second outer member is positioned axially outward from the second shoulder.

15. The guide mechanism of claim 11, wherein the second outer member is positioned axially inward from the third shoulder.

16. The guide mechanism of claim 11, wherein the first outer member is spaced axially apart from the retaining nut.

17. The guide mechanism of claim 11, wherein the second outer member is spaced axially apart from the third shoulder.

18. The guide mechanism of claim 11, wherein adjustment of the retaining nut establishes a range of axial movement of the outer housing relative to the inner housing.

19. The guide mechanism of claim 11, wherein the first angular contact bearing is positioned axially between the first shoulder and the retaining nut.

20. The guide mechanism of claim 11, wherein the second angular contact bearing is positioned axially between the second shoulder and the third shoulder.

21. The guide mechanism of claim 11, wherein the at least one of the first angular contact bearing and the second angular contact bearing comprises a plurality of balls.

22. The guide mechanism of claim 11, wherein at least a portion of the second angular contact bearing is positioned radially outward from the first angular contact bearing.

23. The guide mechanism of claim 11, wherein the retaining nut is configured to selectively establish a predetermined friction torque effecting the rotation of the outer housing relative to the inner housing.

24. The guide mechanism of claim 23, wherein the friction torque is in the range of about six inch-ounces to about twelve inch-ounces.

* * * * *